UNITED STATES PATENT OFFICE.

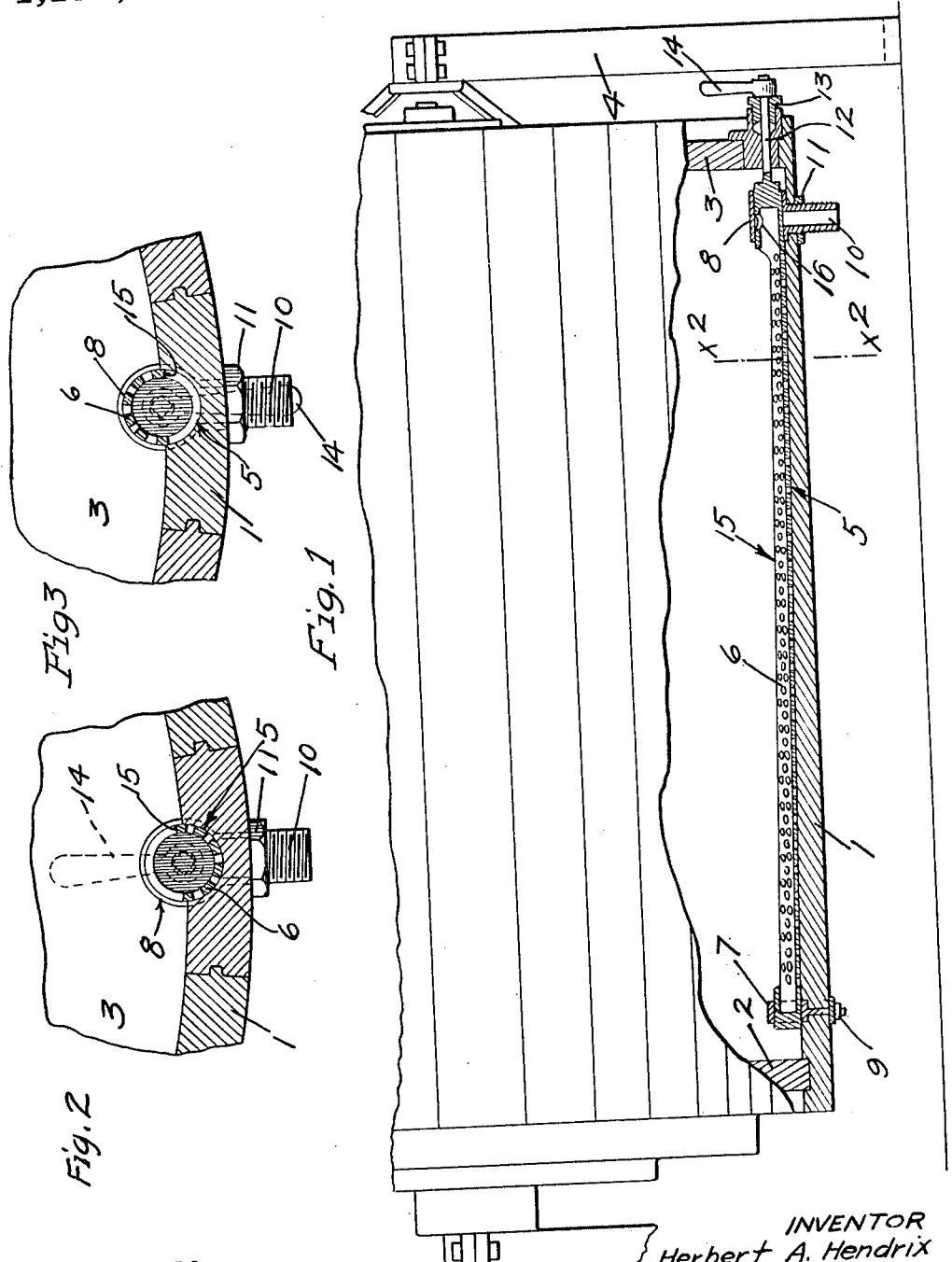

HERBERT A. HENDRIX, OF ALBERT LEA, MINNESOTA.

DRAIN FOR LIQUID-CONTAINING RECEPTACLES.

1,117,570.

Specification of Letters Patent. Patented Nov. 17, 1914.

Original application filed September 10, 1913, Serial No. 789,078. Divided and this application filed May 18, 1914. Serial No. 839,280.

*To all whom it may concern:*

Be it known that I, HERBERT A. HENDRIX, citizen of the United States, residing at Albert Lea, in the county of Freeborn and State of Minnesota, have invented certain new and useful Improvements in Drains for Liquid-Containing Receptacles; and I do hereby declare the following to be a full, clear, and exact description of the invention, such as will enable others skilled in the art to which it appertains to make and use the same.

My invention has for its object to provide an improved drain for liquid-containing receptacles, especially adapted for use in connection with combined churns and butter workers, and is in the nature of a division of my co-pending application entitled "Combined churn and butter-worker," filed September 10, 1913, under Serial Number 789,078.

To the above end, generally stated, the invention consists of the novel devices and combinations of devices hereinafter described and defined in the claims.

In the accompanying drawings, which illustrate the invention, like characters indicate like parts throughout the several views.

Referring to the drawings, Figure 1 is a view, partly in side elevation and partly in central longitudinal vertical section, of a combined churn and butter worker, having applied thereto, in working position, the improved drain; Fig. 2 is a detail view, in section, taken on the line $x^2\ x^2$ of Fig. 1, on an enlarged scale; and Fig. 3 is a view corresponding to Fig. 2, with the exception that the strainer is shown in a different position.

The numeral 1 indicates the drum shell, and the drum heads are indicated by the numerals 2 and 3. This drum is mounted for horizontal rotation on a pair of pedestals 4. As far as my present invention is concerned, the above described parts may be of any desired construction or form.

Formed in the bottom of the drum shell 1, is a longitudinally extended drain groove 5, which extends substantially the full distance between the drum heads 2 and 3, and is inclined toward its delivery end, which is adjacent to the drum head 3. Mounted for axial rotation within the drain groove 5, is a perforated strainer tube 6, the ends of which are journaled in sleeve-like bearings 7 and 8. The bearing 7 is anchored to the drum shell 1 by a nut-equipped stud 9, and the bearing 8 is secured to said shell by a radially projecting discharge nipple 10, integrally formed therewith and extended through the drum shell 1. A nut 11 has screw-threaded engagement with the nipple 10, outward of the drum shell 1, and draws the bearing 8 onto the inner face of said drum shell.

On the discharge end of the strainer tube 6, is an axial rod extension 12, which works through a stuffing box 13 having on its hub a flange which is bolted or otherwise rigidly secured to the drum head 3. It will be noted that the opening in the drum head 3, which is closed by the hub of the stuffing box 13, is of a diameter sufficient to permit the strainer tube 6 to be removed therethrough. On the outer end of the rod 12, is secured a laterally projecting hand piece 14, provided for rotating the strainer tube 6. The strainer tube 6 is longitudinally cut away at 15, substantially the full distance between the bearings 7 and 8, to a semi-cylindrical form. This cut-away portion 15 is inclined toward the delivery end of the strainer tube 6. Normally, the perforated section of the strainer tube 6 is turned down into the groove 5, as shown in Figs. 1 and 2, and the delivery end of said tube, which is imperforate, acts as a valve to normally close the discharge nipple 10.

In the delivery end of the strainer tube 6, is port 16 normally out of registration with the discharge nipple 10, but which when in registration therewith, affords communication between the strainer tube 6 and the nipple 10. When it is desired to drain the churn, the hand piece 14 is turned 180 degrees from its position shown in Fig. 2, to a position as shown in Fig. 3. This turning of the hand piece 14 brings the strainer tube into a position, as shown in Fig. 3, with its perforated section completely covering the drain groove 5, thus preventing any of the butter, or other solid, from entering the drain groove.

In actual usage, a conveying hose or pipe, not shown, will be secured to the depending end of the discharge nipple 10.

It will be noted that both ends of the strainer tube 6 are closed, and when said tube is turned into an operative position, the liquid contents of the drum will pass therethrough directly into the drain groove 5, and from thence through the port 16 into the nipple 10.

By removing the stuffing box the improved strainer may be readily removed from the drum for the purpose of making repairs or to cleanse the same.

What I claim is:

1. The combination with a liquid-containing receptacle, having a drain groove with a discharge passage, of a strainer movably mounted in said groove, having a part movable therewith and affording a valve for said discharge passage, and means for moving said strainer, to open and close said discharge passage.

2. The combination with a liquid-containing receptacle, having a drain groove with a discharge passage, of a strainer tube rotatively mounted in said groove, having a part movable therewith and affording a valve for said discharge passage, and means for rotating said strainer tube, to open and close said discharge passage.

3. The combination with a liquid-containing receptacle, having a drain groove with a discharge passage, of a strainer tube rotatively mounted in said groove, having a part movable therewith and affording a valve for said discharge passage, said strainer tube being cut down, at its intermediate portion, to a semi-cylindrical form, so as to lie within said groove when said discharge passage is closed, and to overlie the same when said discharge passage is open.

4. The combination with a liquid-containing receptacle, having a drain groove with a discharge passage, of a strainer tube rotatively mounted in said groove, having a part movable therewith and affording a valve for said discharge passage, said strainer tube being cut down, at its intermediate portion, to a semi-cylindrical form, so as to lie within said groove when said discharge passage is closed, and to overlie the same when said discharge passage is open, and means for rotating said strainer tube from the exterior of said receptacle.

5. The combination with a liquid-containing receptacle, having a drain groove, of a sleeve-like bearing at the delivery portion of said groove, having a discharge passage extending to the exterior of said receptacle, a strainer tube rotatively mounted in said groove and bearing, having a part movable therewith and affording a valve for said discharge passage, and means for rotating said strainer tube, to open and close said discharge passage.

6. The combination with a liquid-containing receptacle, having a drain groove, of a sleeve-like bearing at the delivery portion of said groove, having a discharge passage extending to the exterior of said receptacle, a strainer tube rotatively mounted in said groove and bearing, having a part movable therewith and affording a valve for said discharge passage, and means for rotating said strainer tube, to open and close said discharge passage, said strainer tube being cut down, at its intermediate portion, to a semi-cylindrical form, so as to lie within said groove when said discharge passage is closed, and to overlie the same when said discharge passage is open.

7. The combination with a liquid-containing receptacle, having a drain groove with a discharge passage, of a strainer tube rotatively mounted in said groove, and being cut down, at its intermediate portion, to a semi-cylindrical form, so as to lie within said groove when in one position, and to overlie the same when in another position.

In testimony whereof I affix my signature in presence of two witnesses.

HERBERT A. HENDRIX.

Witnesses:
S. E. SEVERSON,
ROBERT ANDERSON.

Copies of this patent may be obtained for five cents each, by addressing the "Commissioner of Patents, Washington, D. C."